United States Patent [19]

Tateishi et al.

[11] Patent Number: 5,708,800
[45] Date of Patent: Jan. 13, 1998

[54] HIGH SPEED MICROPROCESSOR FOR PROCESSING AND TRANSFERRING N-BITS OF M-BIT DATA

[75] Inventors: Hiroshi Tateishi; Hiroki Takahashi; Kazuo Nakamura, all of Hyogo, Japan

[73] Assignees: Mitsubishi Denki Kabushiki Kaisha, Tokyo; Mitsubishi Electric Semiconductor Software Corporation, Hyogo, both of Japan

[21] Appl. No.: 487,170

[22] Filed: Jun. 7, 1995

[30] Foreign Application Priority Data

Sep. 27, 1994 [JP] Japan .................................. 6-231420

[51] Int. Cl.$^6$ .................................................. G06F 7/10
[52] U.S. Cl. ................................... 395/523; 395/800
[58] Field of Search ................................ 395/806, 523, 395/565, 800

[56] References Cited

U.S. PATENT DOCUMENTS

| | | | |
|---|---|---|---|
| 4,486,848 | 12/1984 | Kaminski | 364/715 |
| 4,533,992 | 8/1985 | Magar | 395/800 |
| 4,783,837 | 11/1988 | Kawamura | 382/50 |
| 5,185,859 | 2/1993 | Guttag | 395/164 |
| 5,459,681 | 10/1995 | Harrison | 364/736 |
| 5,590,350 | 12/1996 | Guttag | 395/800 |

FOREIGN PATENT DOCUMENTS

| | | |
|---|---|---|
| 61-177539 | 8/1986 | Japan . |
| 61-223956 | 10/1986 | Japan . |
| 61-288243 | 12/1986 | Japan . |
| 62-147545 | 7/1987 | Japan . |
| 63-172332 | 2/1988 | Japan . |
| 63-250763 | 10/1988 | Japan . |
| 1259415 | 10/1989 | Japan . |
| 1302457 | 12/1989 | Japan . |
| 3-160550 | 7/1991 | Japan . |

*Primary Examiner*—Eric Coleman
*Attorney, Agent, or Firm*—Lowe, Price, LeBlanc & Becker

[57] ABSTRACT

A microprocessor comprises a control section for receiving a transfer instruction and transferring N-bits of M-bit data stored at a transfer-source address in a first memory to a transfer-destination address in a second memory in response to a received transfer instruction. In this microprocessor, the transfer of N-bits is performed with the execution of a single transfer instruction. Hence, the memory area required for storing the transfer instructions is reduced, and the residual memory area can be used for other purposes, which improves the efficiency in the use of the memory. The control section stores in the first memory of the microprocessor all the interim results obtained during the execution of a transfer instruction and outputs only the final result to the external memory, reducing the number of machine cycles required for data transfer between the microprocessor and the memory, and further reducing the execution time for data transfer in the microprocessor.

29 Claims, 9 Drawing Sheets

FIGURE 3
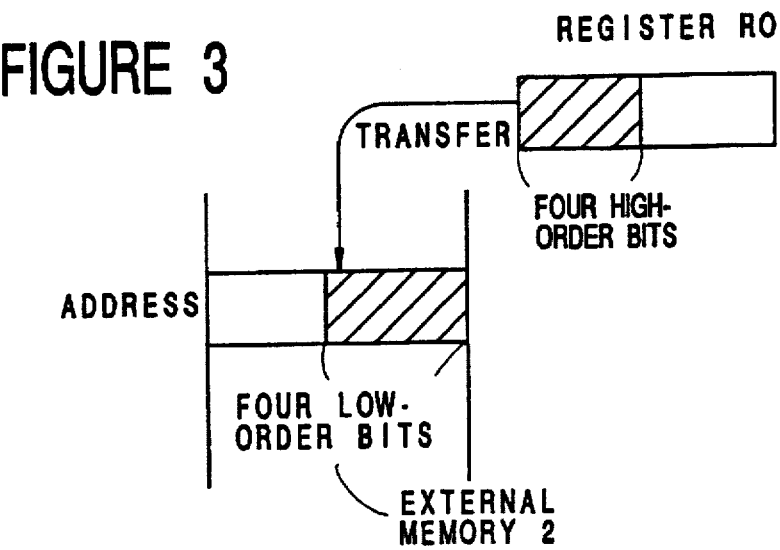
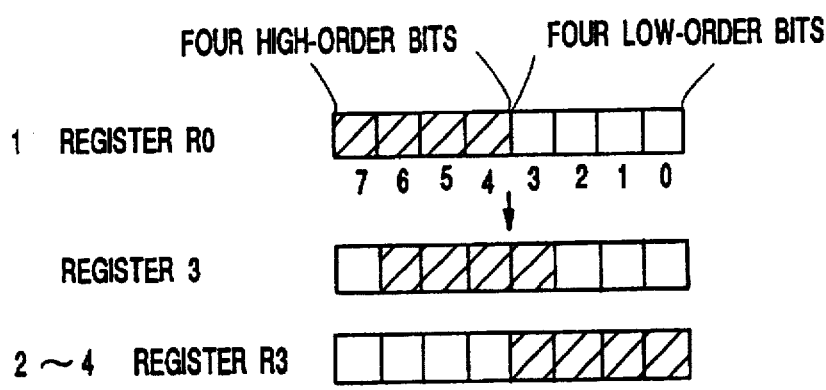

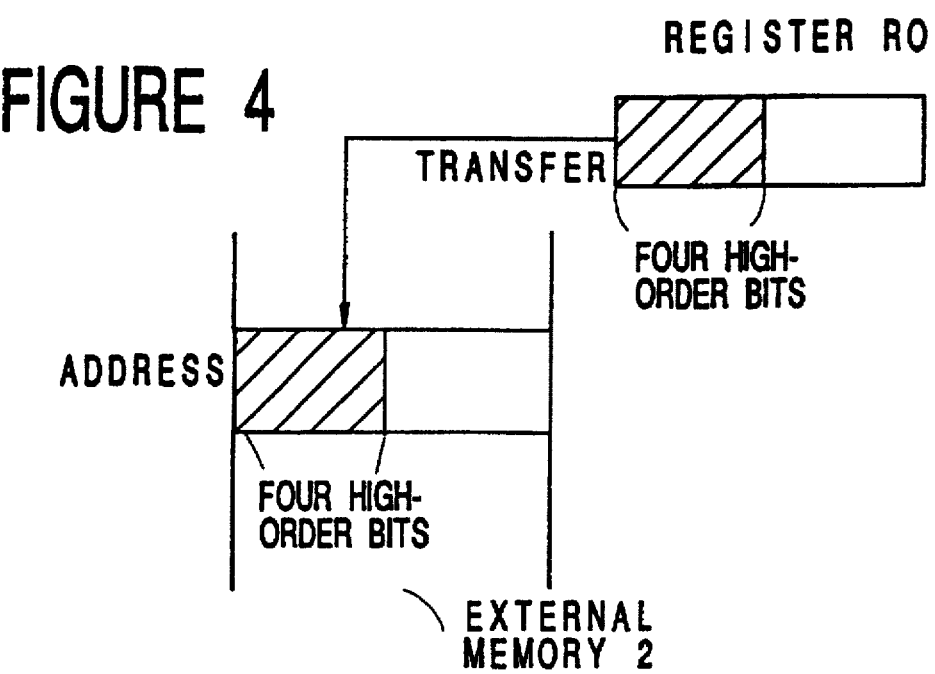
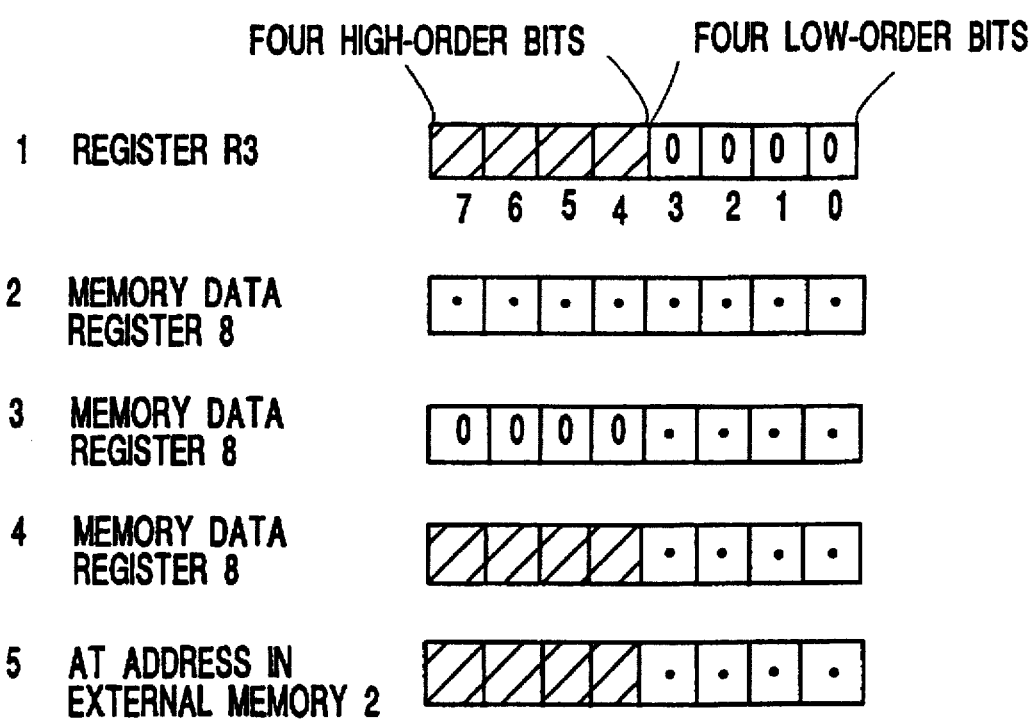

FIGURE 5
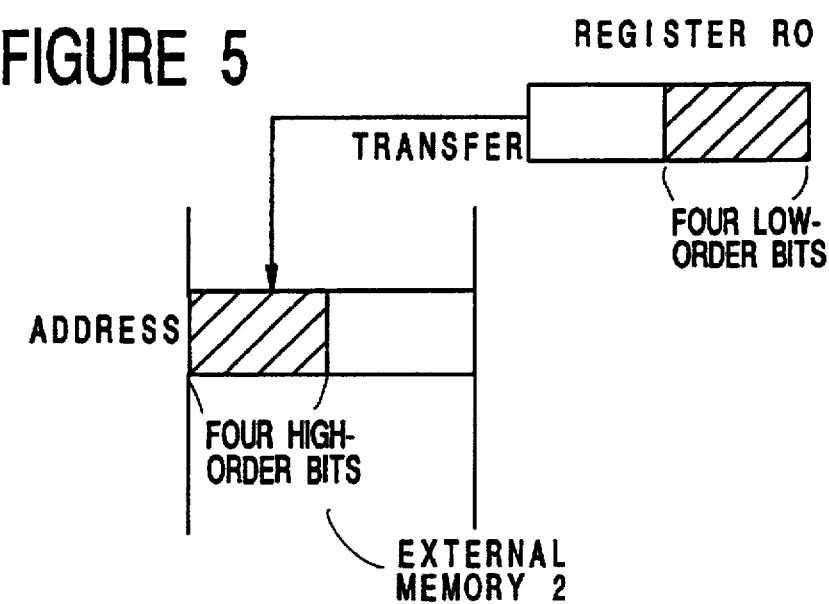
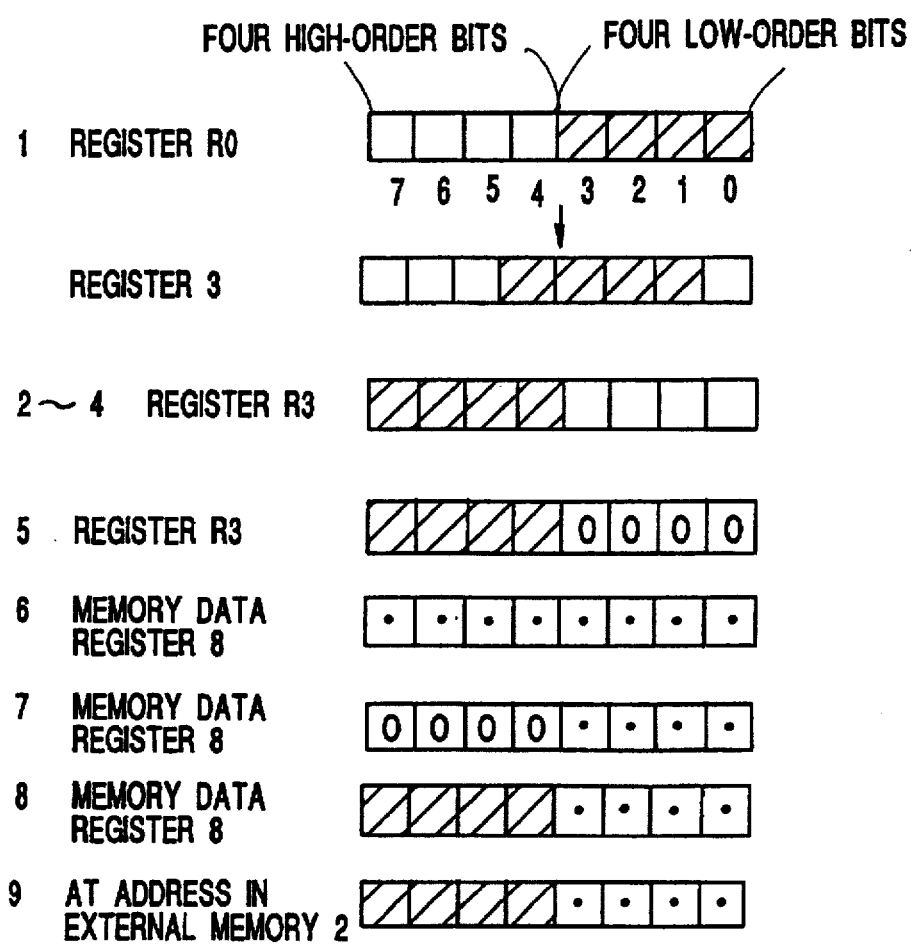

FIGURE 6
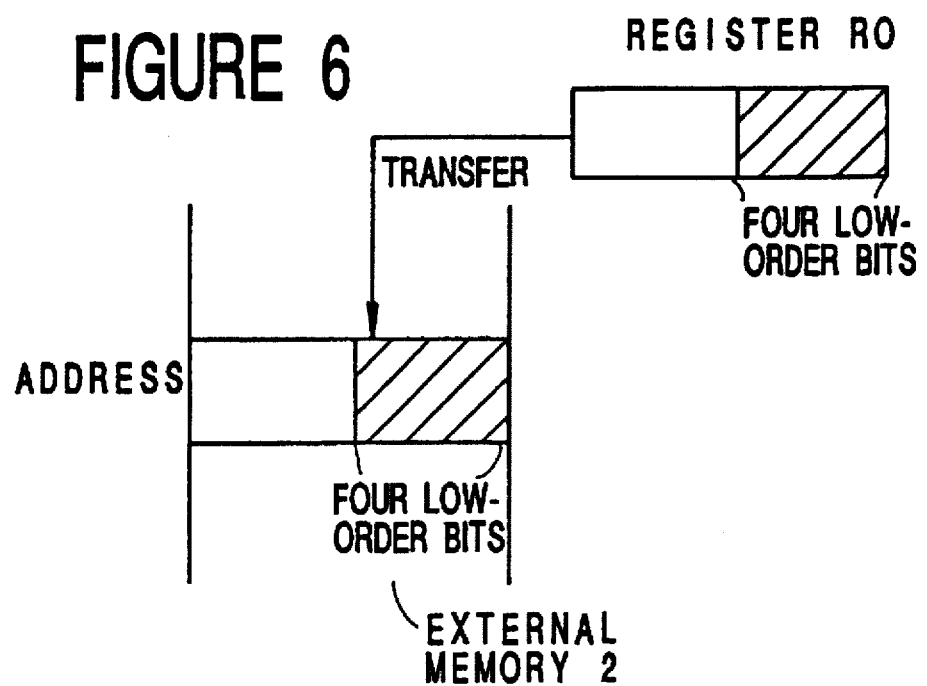
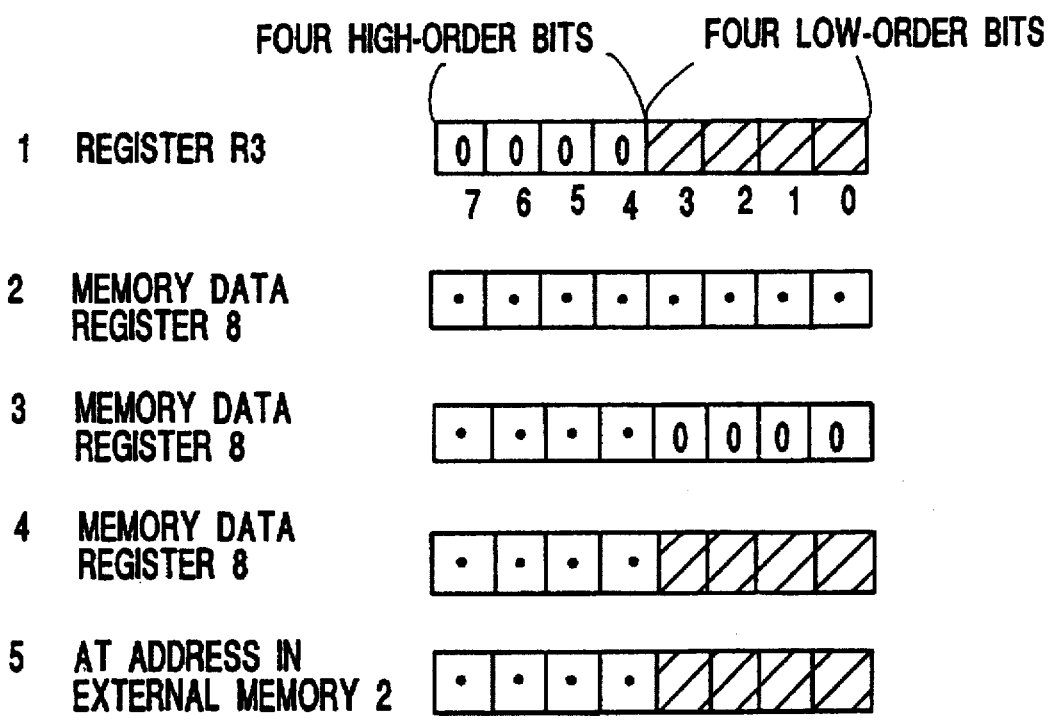

|  |  | NUMBER OF BYTES | NUMBER OF MACHINE CYCLES |
|---|---|---|---|
| LDA | $ZZ | 2 | 2 |
| AND | #$F0 | 2 | 2 |
| STA | $ZY | 2 | 4 |
| TXA |  | 1 | 2 |
| ROR A | A | 1 | 2 |
| ROR A | A | 1 | 2 |
| ROR A | A | 1 | 2 |
| ROR A | A | 1 | 2 |
| AND | #$0F | 2 | 2 |
| ORA | $ZY | 2 | 3 |
| STA | $ZZ | 2 | 4 |

TOTAL 27

FOUR HIGH-ORDER BITS | FOUR LOW-ORDER BITS

HIGH SPEED MICROPROCESSOR FOR PROCESSING AND TRANSFERRING N-BITS OF M-BIT DATA

TECHNICAL FIELD

The present invention relates to a microprocessor for processing and transferring N-bits of M-bit data, where N and M are integers and N<M. The present invention has particular application to a transfer of partial bits (N-bits) of a data unit (M-bit data) between registers or between a register and a memory.

BACKGROUND ART

A conventional microprocessor, e.g., an eight-bit microprocessor, processes and transfers data in a unit of eight bits, i.e., M-bit data, where M=8. Even when only 4 bits of the 8 bit data are needed, the entire 8 bits are processed. For example, a telephone, such as a portable telephone, has ten dial keys from 0 to 9, and a telephone number comprises several decimal numerals. To represent a number in the decimal numeral of a telephone number with digital values of 0's and 1's (binary), only four bits, which can represent up to sixteen numerals, are required. However, the eight-bit microprocessor and memory incorporated in the telephone processes all eight bits rather than selectively processing only the four necessary bits.

For example, although only four bits are required for each number of the phone number, each number is stored in a unit of eight bits at each address location of the memory. When a number of the phone number requires updating by transferring data between the microprocessor and the memory, the corresponding four bits of the number cannot be selectively changed. Instead, an eight-bit data processing is performed several times via an eight-bit bus between the microprocessor and the memory to selectively update the four bits at the address location of the memory.

Further, when N-bits of a M-bit data are transferred between registers or between a register and a memory in a conventional microprocessor, several instructions are required, since single data transfer instruction appropriate for such a purpose has not been realized. Hence, several instructions are stored in the memory for one data-transfer operation, which results in inefficient use of a memory such as a read only memory (ROM). Moreover, the microprocessor stores continuously into the memory each result of the operation derived by each instruction stored in the memory for the transfer of data. Since several instructions are required for one data-transfer operation, several machine cycles are needed for the one data-transfer operation, which increase the number of machine cycles to execute the one data-transfer operation by the microprocessor.

FIG. 7 illustrates an internal configuration of a conventional microprocessor. A microprocessor 1, which handles data in a unit of eight bits, is connected to an external memory 2. The data is stored in a unit of eight bits at each address location of the external memory 2. A register group 3 includes an accumulator A, an accumulator B, an index register X, and an index register Y, and temporarily stores data. An arithmetic logic operation unit 4 (hereinafter referred to as ALU 4) serves as an operation means and is connected to the register group 3 via a first operand bus 5 and a second operand bus 6. The ALU 4 performs operations, such as a bit-shift operation to an operand, and a logical OR or a logical AND operation to two operands, and outputs an operation result to a destination bus 7.

A memory data register 8 temporarily stores data transferred between the microprocessor 1 and the external memory 2. Buses 15 connect the external memory 2 to the memory data register 8. The destination bus 7 provides connections between the ALU 4, the register group 3, and the memory data register 8. The operation results of the ALU 4 are outputted to the register group 3 or to the memory data register 8 via the destination bus 7. The first operand bus 5 and the second operand bus 6 provide connections between the ALU 4, the register group 3, and the memory data register 8. An operand is outputted from the memory data register 8 or the register group 3 to the ALU 4 via one or both of the buses.

A control section 9 comprising a random logic or a microprogram circuit controls each element of the microprocessor 1. The control section 9 outputs to the ALU 4 an operation control signal 10 which specifies a process or an operation to be performed. To the memory data register 8, the control section 9 outputs an input/output control signal 11 for controlling data input/output. The control section 9 outputs a selection signal 12 to the register group 3 for selecting a register within the register group 3.

A decode circuit 13 receives the selection signal 12 from the control section 9 and outputs a selection control signal 14 to the register group 3 for selecting a register of the register group 3. The decoded signal of the decode circuit 13 determines which register of the register group 3 outputs its data to the first operand bus 5 or the second operand bus 6, and which register of the register group 3 the data from the destination bus 7 is inputted.

FIG. 10 illustrates a detailed configuration of the decode circuit 3 shown in FIG. 7. Upon receiving a selection signal 12, i.e. P1 and P0, from the control section 9, the decode circuit generates a selection control signal 14, i.e. S0 through S3, indicating a register to be selected among the four registers of the register group 3.

FIG. 8 shows an assembly language program which runs on the microprocessor 1 shown in FIG. 7. FIG. 9 illustrates the positions of the four high-order and four low-order bits of an eight-bit data stored in a register or the like. The program shown in FIG. 8 changes the four (N=4) low-order bits of the eight (M=8) bit data stored at an address ZZ in the external memory 2 with the four high-order bits of the eight bit data stored in the index register X. This program is used for the four-bit data transfer between the external memory 2 and the microprocessor 1, which processes and transfers data in the unit of eight bits. The number of bytes and the number of machine cycles for each instruction are also shown at the right of the program in FIG. 8. The number of machine cycles is indicative of the time required for executing the corresponding instruction in the microprocessor 1.

A "load accumulator with memory" (LDA) instruction at a first line of the program is a read out instruction to store in the accumulator A or B the eight-bit data stored at address ZZ in the external memory 2. A character "$" indicates that the succeeding characters represent an address of the external memory 2. The selection control signal 14 based on a selection signal 12 from the control section 9 selects one of the two accumulators A and B. In this example, the data is stored in the accumulator A in response to the selection control signal 14.

A "logical AND" (AND) instruction at the second line of the program is a logical AND instruction to perform a logical AND operation between the eight-bit data stored in the accumulator A and an immediate data F0 (hexadecimal) to mask the four low-order bits of the accumulator A. The characters "#$" indicate that the succeeding characters represent an immediate data.

A "store accumulator in memory" (STA) instruction at the third line of the program is a data store instruction to the external memory 2. When the STA instruction is executed, the external memory 2 stores the masked eight-bit data, described above, at the address ZY in the external memory 2 through the memory data register 8.

A "transfer index X to accumulator" (TXA) instruction at the fourth line of the program is a transfer instruction. When this instruction is executed by the microprocessor 1, the eight-bit data stored in the index register X is transferred to the accumulator A under the control of the control section 9.

The "rotate one bit right" (ROR) instruction at the fourth to eighth line of the program instructs the microprocessor 1 to rotate or shift the eight-bit data stored in the accumulator A to the right by one bit at each cycle. When this instruction is repeated four times, the four high-order bits of accumulator A is moved to the positions of the four low-order bits.

An AND instruction at the ninth line of the program instructs the ALU 4 to perform a logical AND operation between the eight-bit data stored in the accumulator A and the immediate data 0F (hexadecimal) to mask the four high-order bits of the accumulator A. The operation result is sent through the destination bus 7 and stored in the accumulator A.

An "OR memory with accumulator" (ORA) instruction at the tenth line of the program produces the logical sum of the eight-bit data stored in the accumulator A and the eight-bit data stored at the address ZY of the external memory 2. Then the operation result is stored in the accumulator A. When the STA instruction at the eleventh line of the program is executed by the microprocessor 1, the eight-bit data stored in the accumulator A is transferred and stored at the address ZZ of the external memory 2.

With conventional microprocessors, several instructions are required since a single data transfer instruction has not been realized. When a data having fewer bits (e.g., four bits) than that of the data unit (e.g., eight bits) are processed and transferred between the registers or between the register and the memory, several instructions are required. Since several instructions are stored in a memory such as a ROM for data transfer operations, there is a poor efficiency in the use of the memory.

DISCLOSURE OF THE INVENTION

It is an object of the present invention to provide a microprocessor having a reduced execution time, i.e., the number of machine cycles, required for a data transfer operation.

Another object is to provide a microprocessor with improved memory use efficiency by performing a transfer between registers or between a register and a memory using a single instruction.

A further object of the present invention is to provide a data transfer operation where N-bits of M-bit data are transferred by the microprocessor during an execution of a single instruction.

Additional objects, advantages and other features of the invention will be set forth in part in the description which follows and in part will become apparent to those having ordinary skill in the art upon examination of the following or may be learned from the practice of the invention.

According to the present invention, the foregoing and other objects are achieved in part by a microprocessor comprising a control means for receiving a transfer instruction to transfer a N-bits of M-bit data stored in the first memory means to an address in the second memory means in response to the received transfer instruction.

The control means comprises a decode circuit for receiving and decoding a transfer instruction, and a micro ROM including a microprogram or a random logic. The micro ROM or random logic receives the decoded result sent from the decode circuit and specifies the execution sequence of the transfer instruction in the microprocessor. The control means also controls a transfer operation so that half of the bits of the first data are transferred from a first memory means to a second memory means.

In another aspect of the invention, the control means stores in a first memory means all the interim results obtained during an execution of a transfer instruction, and outputs only a final logical-operation result of first and second data to a second memory means, thus reducing the number of machine cycles required for the execution of the transfer instruction.

A further aspect of the invention is a first memory means which is preferably provided in a microprocessor while a second memory means is provided outside the microprocessor. A micro ROM stores into the first memory means all interim results obtained during the execution of the transfer instruction, and outputs to the second memory means only a final logical-operation result of first and second data.

In another aspect of the present invention, a micro ROM or a random logic masks the bits other than the N-bit data in the M-bit first data stored at a transfer-source address in a first memory means, masks a position at which the N-bit data is to be stored in the second data in the second memory means at a transfer-destination address, performs a logical OR operation between the first and second data, and then stores the result at the transfer-destination address in the second memory means.

Another aspect of the present invention is a microprocessor for transferring N bits of a M-bit data stored in a first register of the microprocessor to an arbitrary M-bit area of an external memory, where N and M are positive integers, comprising a control circuit for controlling an operation of the microprocessor, an arithmetic logic operation unit (ALU), a second register, a mask ROM, and a memory data register. The control circuit controls an operation of the microprocessor and includes a decode circuit to retrieve and to decode an instruction from the external memory, and a ROM or random logic having a micro program to generate an input/output control signal, a register select signal, an operation control signal and a data selection signal in accordance with the decoded instruction from the decode circuit.

The ALU carries out a first operation on the M-bit data inputted from the first register, in accordance with the operation control signal from the control circuit, and outputs a first operation result. The second register, selected in accordance with the register select signal, temporarily stores the first operation result from the ALU.

The mask ROM generates a predetermined mask data, selected in accordance with the data select signal, for masking M-N or N bits of the M-bit data and outputs the predetermined mask data to the ALU. The ALU carries out a second operation between the first operation result stored in the second register and predetermined mask data in accordance with operation control signal, and outputs a second operation result which is stored in the second register in accordance with the register select signal.

The memory data register receives the M-bit data from the external memory and outputs the M-bit data to the ALU in response to the input/output control signal. The mask ROM outputs the predetermined mask data, selected in accordance with the data select signal, to the ALU, and the ALU carries out a third operation in accordance with the operation control signal between the M-bit data and the predetermined mask data, and outputs a third operation result which is stored in memory data register.

The second operation result stored in the second register and the third operation result stored in the memory data register are inputted to the ALU which carries out a fourth operation in accordance with the operation control signal to output a fourth operation result to the memory data register. The fourth operation result is transferred from the memory data register to the external memory in response to the input/output control signal.

Still another aspect of the invention is a mask ROM which generates a predetermined mask data, selected in accordance with the data select signal, for masking M-N or N bits of data. An ALU carries out a first operation on the M-bit inputted from the first register and the predetermined mask data and outputs a first operation result in accordance with the operation control signal from the control circuit. The second register temporarily stores the first operation result from the ALU, and a memory data register receives M-bit from the external memory and outputs the M-bit to the ALU in response to the input/output control signal. The mask ROM outputs a predetermined mask data and the ALU carries out a second operation in accordance with the operation control signal between the M-bit data and the predetermined mask data, and outputs a second operation result which is stored in a memory data register. The first operation result stored in the second register and the second operation result stored in the memory data register are inputted to the ALU which carries out a third operation to output a third operation result to the memory data register. The third operation result is transferred from the memory data register to the external memory in response to the input/output control signal.

A further aspect of the invention are methods for transferring N bits of a M-bit data stored in a first register in a microprocessor to an arbitrate M-bit area of an external memory, where N and M are positive integers.

BRIEF DESCRIPTION OF THE DRAWINGS

The invention will be described in detail with reference to the following drawings in which like reference numerals refer to like elements.

FIG. 3 is an illustration of an operation sequence for a "move high to low nibble" (MOVHL) instruction.

FIG. 4 is an illustration of an operation sequence for a "move high to high nibble" (MOVHH) instruction.

FIG. 5 is an illustration of an operation sequence for a "move low to high nibble" (MOVLH) instruction.

FIG. 6 is an illustration of an operation sequence for a "move low to low nibble" (MOVLL) instruction.

FIG. 8 shows a machine language program which runs on a microprocessor shown in FIG. 7.

FIG. 9 illustrates positions of four high-order and four low-order bits of an eight-bit data stored in a register or the like.

BEST MODE FOR CARRYING OUT THE INVENTION

Figure 1:
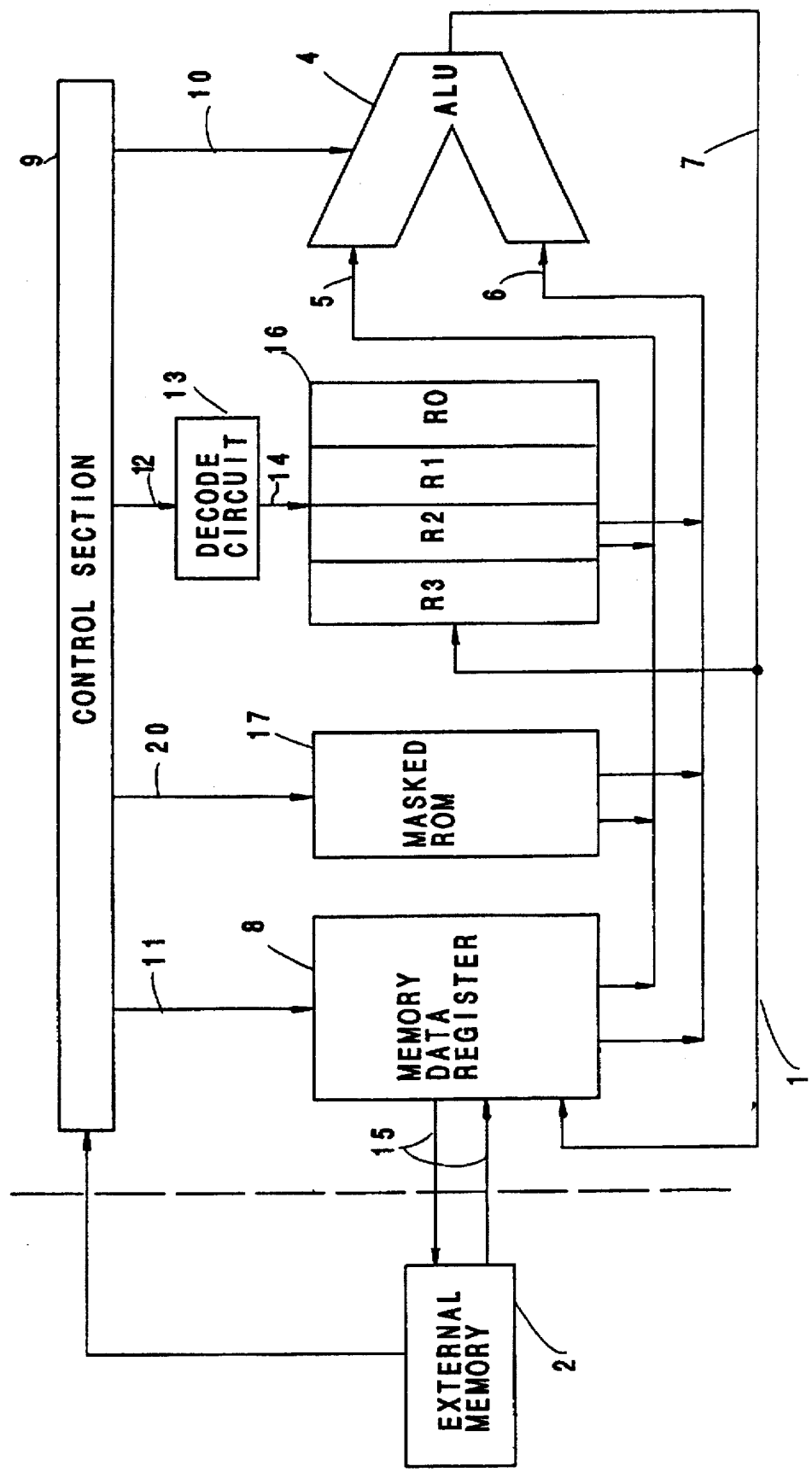
FIG. 1 is a schematic configuration of a microprocessor of the present invention.
Figure 7:
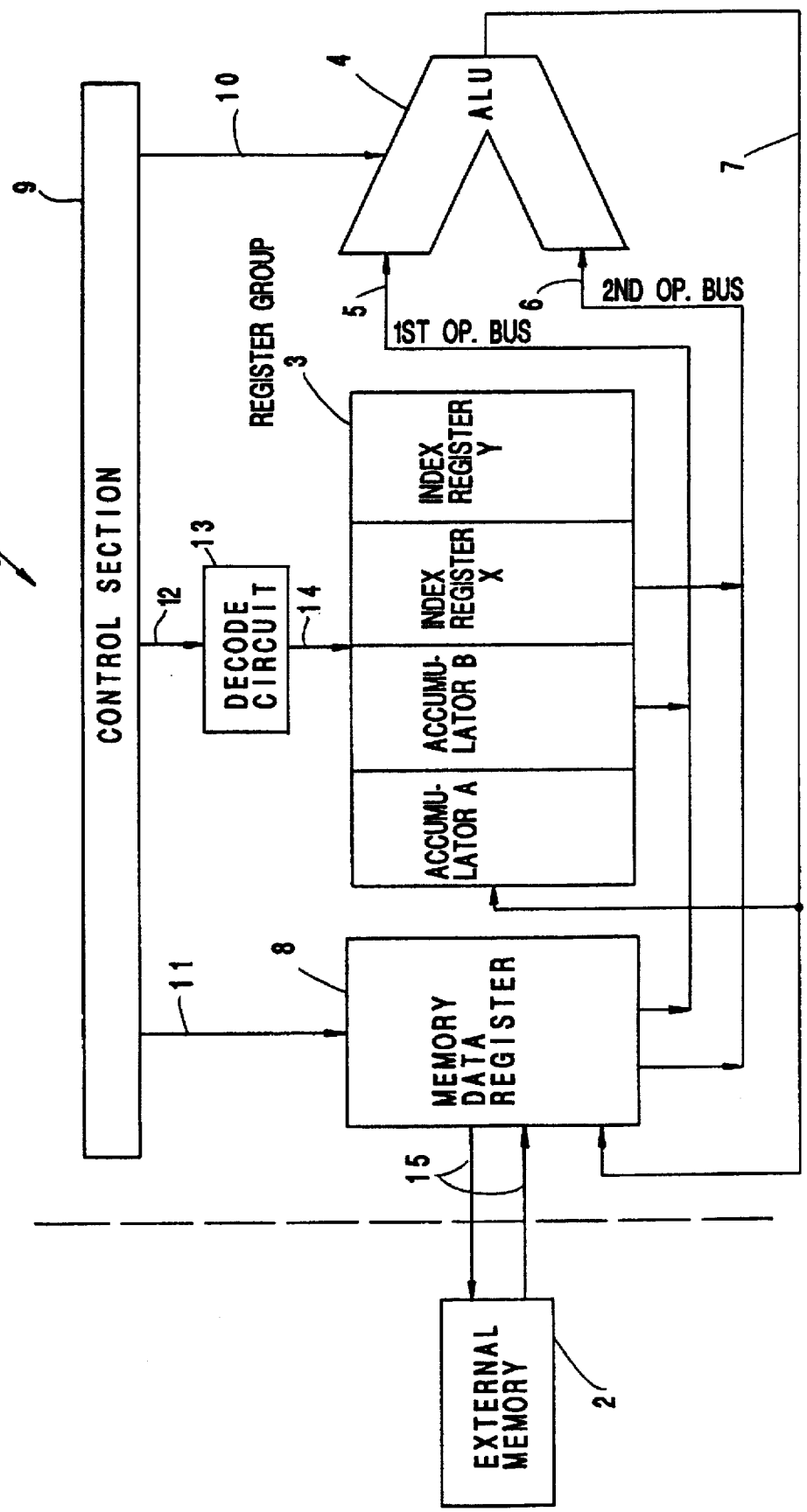
FIG. 7 illustrates an internal configuration of a conventional microprocessor.
Figures 8, 9:
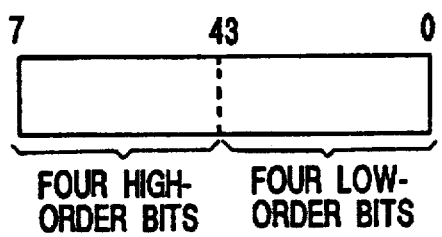
Figure 10:
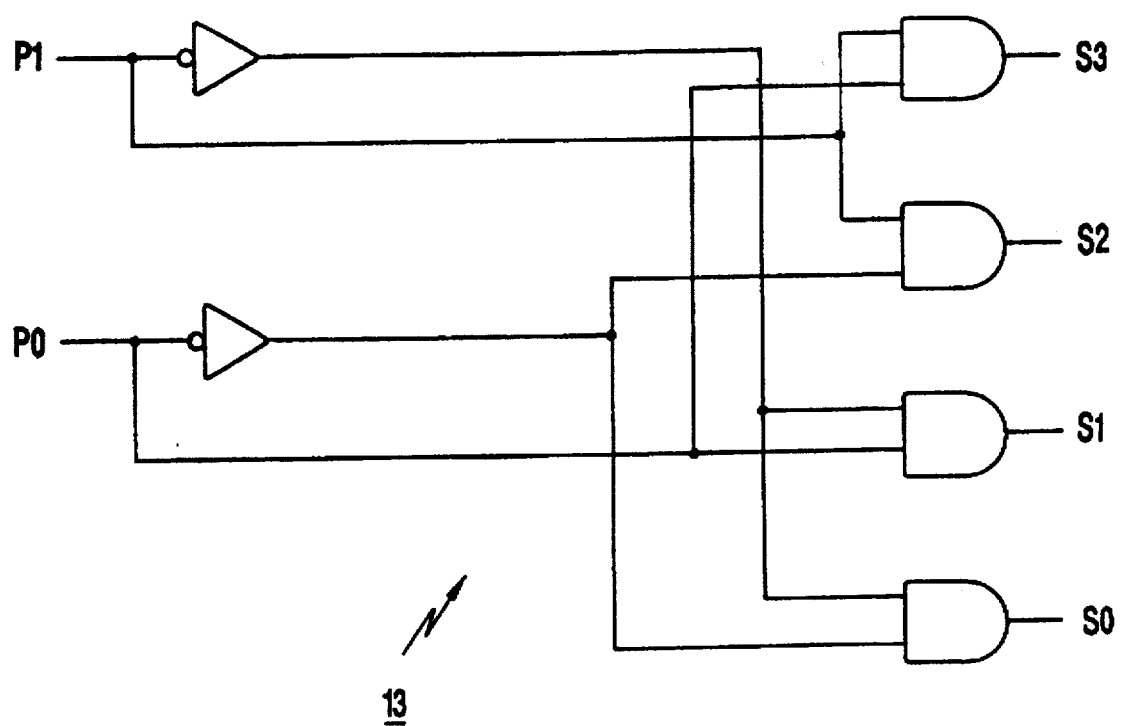
FIG. 10 illustrates a detailed configuration of a decode circuit shown in FIG. 7.

FIG. 1 illustrates a configuration of a microprocessor of the present invention. The microprocessor 1 processes data in a unit of eight bits. A register group 16 of the present invention comprises registers R0 through R3 to correspond to the format of a transfer instruction to be described below. This register group 16 may be provided with accumulators and index registers, as in the conventional registers shown in FIG. 7. The microprocessor further includes a mask ROM 7 for storing predetermined mask data. A predetermined mask data 0F (hexadecimal) masks the four high-order bits of eight bits data, and a predetermined mask data F0 (hexadecimal) masks the four low-order bits of eight bits data. The mask ROM 17 outputs the predetermined mask data through the first operand bus 5 or the second operand bus 6, according to a signal sent from a control section 9.

Figure 2:
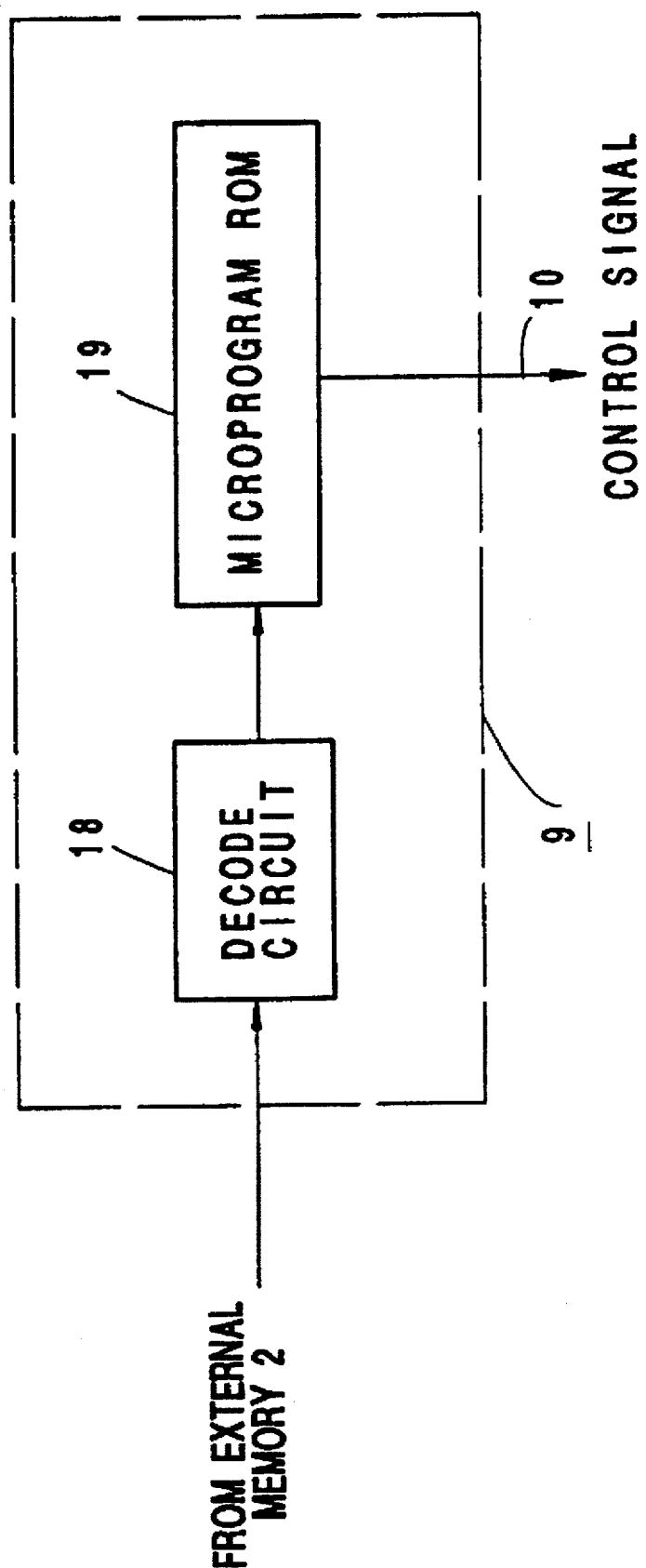
FIG. 2 illustrates an inner configuration of a control section shown in FIG. 1.

The control section 9 comprises a random logic circuit or a microprogram circuit which controls the operation of each element in the microprocessor 1 based on an instruction sent from the external memory 2 to the microprocessor 1. FIG. 2 illustrates an inner configuration of the control section 9 shown in FIG. 1. A decode circuit 18 fetches and decodes an instruction sent from the external memory 2. A micro ROM 19 including a microprogram generates a control signal such as an operation control signal 10 for each unit of the microprocessor 1 in response to a decoded instruction. As can be appreciated, the micro ROM 19 may be substituted with a random logic. The operations of the microprocessor 1 in response to an input instruction is predetermined by the micro ROM.

FIG. 3 is an illustration of an operation sequence for a "move high to low nibble" (MOVHL) instruction, where four high-order bits of an eight-bit data stored in a register R0 are transferred to four low-order bits of an eight-bit data area at an arbitrary address in an external memory 2. The control section 9 fetches the MOVHL instruction from an instruction memory area in the external memory 2. Based on the microprogram corresponding to the MOVHL instruction, the control section 9 output a control signal to each element of the microprocessor 1. Each sequence (1) to (9) indicates the operation in the microprocessor 1 during each machine cycle, and sequence numerals (1) to (9) described below correspond to the numerals shown in FIG. 3.

(1) The eight-bit data stored in the register R0 is inputted to the ALU 4 through the first operand bus 5. The eight-bit data is right-rotated or right-shifted by one bit, and the operation result is temporarily stored in a register R3 through the destination bus 7. Right-rotation by one bit means that all the bits of data are shifted right by one bit, and an underflowed bit 0 is shifted to bit 7. Alternatively, the content of the carry flag is shifted to bit 7, and bit 0 is shifted to the carry flag. When an eight-bit data is already stored in the register R3, the date needs to be temporarily transferred to the external memory 2 or the like when the control section 9 fetches the MOVHL instruction. In this example, it is assumed that the register R3 stores the operation result of the data rotation in the ALU 4 in response to the register select signal 12. As can be appreciated, register R0, R1 or R2 can also be selected to store the operation result of the eight-bit data.

(2) The data stored in the register R3 is inputted to the ALU 4 through the first operand bus 5. The eight-bit data is right-rotated by one bit in the ALU 4, and the operation result is stored in the register R3 through the destination bus 7.

(3) The same operation is performed as described above in sequence (2).

(4) The same operation is performed as described above in sequence (2).

(5) The eight-bit data stored in the register R3, which has been right-rotated four times, is inputted to the ALU 4 through the first operand bus 5, and the mask data 0F (hexadecimal) stored in the mask ROM 17 is inputted to the ALU 4 through the second operand bus 6. The mask data stored in the mask ROM 17, either F0 or 0F (both hexadecimal), is selected in accordance with a data selection signal 20 sent from the control section 9. A logical AND operation is carried out between these two data by the ALU 4, and the operation result is stored in the register R3 through the destination bus 7.

(6) The eight-bit data stored at the address in the external memory 2, to which the four high-order bits of the register R0 is to be stored, is transferred to the memory data register 8.

(7) The eight-bit data stored in the memory data register 8 is inputted to the ALU 4 through the first operand bus 5, and the mask data F0 (hexadecimal) stored in the mask ROM 17 is also inputted to the ALU 4 through the second operand bus 6. A logical AND operation is performed between these two data by the ALU 4, and the operation result is stored in the memory data register 8 through the destination bus 7.

(8) The eight-bit data stored in the register R3 is inputted to the ALU 4 through the first operand bus 5, and the eight-bit data stored in the memory data register 8 is inputted to the ALU 4 through the second operand bus 6. A logical OR operation is carried out between these data by the ALU 4, and the operation result is stored in the memory data register 8 through the destination bus 7.

(9) The eight-bit data stored in the memory data register 8 is transferred and stored at the address in the external memory 2 described in sequence (6) above.

The operation of the ALU 4, e.g., right-rotation, logical OR, or logical AND, is performed in accordance with an operation control signal 10 outputted from the micro ROM in the control section 9. Each sequence indicates the operation for one machine cycle which is the time period required for processing a data transfer between two registers among registers R0 through R3, a data transfer between the external memory 2 and the microprocessor 1, or an operation in the ALU 4. Also, data transfer and operation on a bus, data reading for an operation, and data writing of the operation result are performed within one machine cycle.

Using a single MOVHL instruction with the random logic or the microprogram in the control section 9, a high-speed four-bit data transfer between the external memory 2 and the microprocessor 1 is realized, where a short period of time, i.e., few machine cycles, is required. The four high-order bits of the eight-bit data stored in a register of the microprocessor 1 are transferred to the position of the four low-order bits of the eight-bit data at an address in the external memory 2, as described above in sequences (1) to (9), in nine machine cycles.

FIG. 4 is an illustration of an operation sequence for a "move high to high nibble" (MOVHH) instruction where four high-order bits of the eight-bit data stored in register R0 are transferred to the position of four high-order bits of an eight-bit data area at an arbitrary address in the external memory 2.

The control section 9 fetches the MOVHH instruction from the instruction memory area in the external memory 2. Based on the microprogram corresponding to the MOVHH instruction, the control section 9 outputs a control signal to each element of the microprocessor 1. Each sequence (1) to (5) indicates the operation in the microprocessor 1 during each machine cycle, and the sequence numerals (1) to (5) described below correspond to the numerals shown in FIG. 4.

(1) The eight-bit data stored in the register R0 is inputted to the ALU 4 through the first operand 5, and the mask data F0 (hexadecimal) stored in the mask ROM 17 is inputted to the ALU 4 through the second operand bus 6. A logical AND operation is applied to these two data by the ALU 4, and the operation result is stored in the register R3 through the destination bus 7.

(2) The eight-bit data stored at an address in the external memory 2, to which the four high-order bits of the data in the register R0 is to be stored, is transferred to the memory data register 8.

(3) The eight-bit data stored in the memory data register 8 is inputted to the ALU 4 through the first operand bus 5, and the mask data 0F (hexadecimal) stored in the mask ROM 17 is inputted to the ALU 4 through the second operand bus 6. A logical AND operation performed between these data by the ALU 4, and the operation result is stored in the memory data register 8 through the destination bus 7.

(4) The eight-bit data stored in the register R3 is inputted to the ALU 4 through the first operand bus 5, and the eight-bit data stored in the memory data register 8 is inputted to the ALU 4 through the second operand bus 6. A logical OR operation is carried out between these two data by the ALU 4, and the operation result is stored in the memory data register 8 through the destination bus 7.

(5) The eight-bit data stored in the memory data register 8 is transferred and stored at the address described above in sequence (2) of the external memory 2.

Using a single MOVLH instruction with the random logic or the micro program in the control section 9, a high-speed four-bit data transfer between the external memory 2 and the microprocessor 1 is realized where only a few number of machine cycle, i.e., short period of time, is required. The four low-order bits of the eight-bit data stored in a register of the microprocessor 1 are transferred to the position of the four high-order bits of the eight-bit data at an address in the external memory 2, as described above in sequences (1) to (5), in five machine cycles.

FIG. 5 is an illustration of an operation sequence for a "move low to high nibble" (MOVLH) instruction, where four low-order bits of the eight-bit data stored in the register R0 are transferred to the position of four high-order bits of the eight-bit data area at an arbitrary address in the external memory 2. Each sequence (1) to (9) indicates the operation in the microprocessor 1 during each machine cycle and the sequence numerals (1) to (9) described below correspond to the numerals shown in FIG. 5.

(1) The eight-bit data stored in the register R0 is inputted to the ALU 4 through the first operand bus 5. The eight-bit data is left-rotated or left-shifted by one bit in the ALU 4, and the operation result is temporarily stored in the register R3 through the designation bus 7. The left-rotation by one bit means that all the bits of the eight-bit data are shifted by one bit, and the overflowed bit 7 is shifted to bit 0. Alternatively, the contents of the carry flag is shifted to bit 0 and bit 7 is shifted to the carry flag.

(2) The data stored in the register R3 is inputted to the ALU 4 through the first operand bus 5. The eight-bit data is left-rotated by one bit in the ALU 4, and the operation result is stored in the register R3 through the destination bus 7.

(3) The same operation is performed as described above in sequence (2).

(4) The same operation is performed as described above in sequence (2).

(5) The eight-bit data in the register R3, which has been left-shifted four times, is inputted to the ALU 4 through the first operand bus 5, and the mask data F0 (hexadecimal) is inputted to the ALU 4 through the second operand bus 6. A logical AND operation is performed between these two data, and the operation result is stored in the register R3 through the destination bus 7.

(6) The eight-bit data stored at an address in the external memory 2, to which the four low-order bits of the register R0 is to be stored, is transferred to the memory data register 8.

(7) The eight-bit data stored in the memory data register 8 is inputted to the ALU 4 through the first operand bus 5, and the mask data 0F stored in the mask ROM 17 is inputted to the ALU 4 through the second operand bus 6. A logical AND operation is performed between these two data by the ALU 4, and the operation result is stored in the memory data register 8 through the destination bus 7.

(8) The eight-bit data stored in the register R3 is inputted to the ALU 4 through the first operand bus 5, and the eight-bit data stored in the memory data register 8 is inputted to the ALU 4 through the second operand bus 6. A logical OR operation is carried out between these two data by the ALU 4, and the operation result is stored in the memory data register 8 through the destination bus 7.

(9) The eight-bit data stored in the memory data register 8 is transferred and stored at the address in the external memory 2 described in sequence (6) above.

Using a single MOVLH instruction with the random logic or the micro program of the control section 9, a high-speed four-bit data transfer between the external memory 2 and the microprocessor 1 is realized where a short period of time, e.g., nine machine cycles, is required. The four low-order bits of the eight-bit data stored in the register R0 of the microprocessor 1 are transferred to the position of the four high-order bits of the eight-bit data at an arbitrary address in the external memory 2, as described above in sequences (1) to (9), in nine machine cycles.

FIG. 6 is an illustration of an operation sequence for a "move low to low nibble" (MOVLL) instruction, where four low-order bits of the eight-bit data stored in the register R0 of the microprocessor 1 are transferred to the position of four low-order bits of the eight-bit data area at an arbitrary address in the external memory 2. Each sequence (1) to (5) indicates the operation in the microprocessor during each machine cycle and the sequence numerals (1) to (5) described below correspond to the numerals shown in FIG. 6.

(1) The eight-bit data stored in the register R0 is inputted to the ALU 4 through the first operand bus 5, and the mask data 0F (hexadecimal) stored in the mask ROM 17 is inputted to the ALU 4 through the second operand bus 6. A logical AND operation is applied to these two data by the ALU 4, and the operation result is stored in the register R3 through the destination bus 7.

(2) The eight-bit data stored at an address in the external memory 2, to which the four low-order bits of the data stored in the register R0 is to be stored, is transferred into the memory data register 8.

(3) The eight-bit data stored in the memory data register 8 is inputted to the ALU through the first operand bus 5, and the mask data F0 (hexadecimal) stored in the mask ROM 17 is inputted to the ALU 4 through the second operand bus 6. A logical AND operation is performed between these two data, and the operation result is stored in the memory data register 8 through the destination bus 7.

(4) The eight-bit data stored in the register R3 is inputted to the ALU 4 through the first operand bus 5, and the eight-bit data stored in the memory data register 8 is inputted to the ALU 4 through the second operand bus 6. A logical OR operation is carried out between these two data by the ALU 4, and the operation result is stored in the memory data register 8 through the destination bus 7.

(5) The eight-bit data stored in the memory data register 8 is transferred and stored at the address described above in sequence (2) of the external memory 2.

Using a single MOVLL instruction with the random logic or the micro program in the control section 9, a high-speed four-bit data transfer between the external memory 2 and the microprocessor 1 is realized where a short period of time, e.g., machine cycles, is required. The four low-order bits of the eight-bit data stored in a register of the microprocessor 1 are transferred to the position of the four low-order bits of the eight-bit data at an arbitrary address in the external memory 2, as described above in sequences (1) to (5), in five machine cycles.

The present invention provides the control means which transfers by a single instruction the data having fewer bits than that of the data unit to be processed in the microprocessor from the first memory means to the second memory means. Hence, an instruction memory area required for storing the transfer instructions is reduced so that the memory area can be used for other data processes and operations.

There accordingly has been described a unique microprocessor and the sequences for operating the microprocessor for transferring N-bits of M-bit data, where N and M are integers and M>N. The foregoing embodiments are merely exemplary and not to be construed as limiting the basic concept of transferring N-bits of M-bit data in a microprocessor, but it is not limited to only microprocessors. Many modifications, alternatives and variations will be apparent to those skilled in the art. For example, the control means may store in the first memory means all the interim results obtained during the execution of a transfer instruction, and output only the final result, e.g., the result of the logical OR operation from the microprocessor to the other memory, which reduces the number of machine cycles required for the data transfer between the microprocessor and the memory and further reducing the execution time. As can be appreciated, the bit rotation or shifting can be performed in four bits rather than one bit at a time, which further reduces the number of machine cycles for a transfer operation. Hence, it is understood that the present invention may be practiced otherwise than as specifically described within the scope of the appended claims.

What is claimed is:

1. A microprocessor for transferring N bits of a M-bit data stored in a first register of a microprocessor to an arbitrary M-bit data area of an external memory, where N and M are positive integers and N<M, comprising:

a) a control circuit for generating control signals to control an operation of the microprocessor;

b) a register group including at least the first register and a second register;

c) a first operand bus and a second operand bus coupled to said register group;

d) an ALU connected to the first and second operand buses and carrying out a first operation on the M-bit data inputted from first register via the first operand bus;

e) a destination bus coupled to the ALU and the second register, the ALU outputting a first operation result to the second register via the destination bus;

f) a mask ROM connected to the first and second operand buses and generating a predetermined mask data for masking M-N or N bits of the M-bit data and outputting the predetermined mask data to the ALU via the first or second operand bus, said ALU carrying out a second operation between the first operation result stored in the second register and the predetermined mask data, and outputting a second operation result which is stored in said second register via the destination bus; and g) a memory data register connected to the first and second operand buses and the destination bus, and receiving M-bit data from the external memory and outputting the M-bit data to said ALU via the first or second operand bus, said ALU carrying out a third operation between the M-bit data and the predetermined mask data, and outputting a third operation result to the destination bus.

2. The microprocessor of claim 1, wherein N equals 4 and M equals 8.

3. The microprocessor of claim 2, wherein the predetermined mask data used for masking the first operation result during the second operation of said ALU is 0F (hexadecimal), and the predetermined mask data for masking the M-bit data from said memory data register during the third operation of said ALU is F0 (hexadecimal).

4. The microprocessor of claim 2, wherein the predetermined mask data used for masking the first operation result during the second operation of said ALU is F0 (hexadecimal), and the predetermined mask data for masking the M-bit data from said memory data register during the third operation of said ALU is 0F.

5. The microprocessor of claim 1, wherein the microprocessor transfers N high-order bits of the M-bit data stored in the first register to N low-order bits of the arbitrary M-bit data area of the external memory.

6. The microprocessor of claim 1, wherein the microprocessor transfers N low-order bits of the M-bit data stored in the first register to N high-order bits of the arbitrary M-bit data area of the external memory.

7. The microprocessor of claim 1, wherein said ALU shifts by one bit the M-bit data from the first register and said ALU shifts by one bit at least N−1 times the first operation result temporarily stored in said second register.

8. The microprocessor of claim 1, wherein the second and third operations are logical AND operations.

9. The microprocessor of claim 1, wherein said control circuit includes:

i) a decode circuit to retrieve and to decode an instruction from the external memory, and ii) a ROM or random logic having a microprogram to generate an input/output control signal, a register select signal, an operation control signal and a data selection signal in accordance with the decoded instruction from said decode circuit.

10. The microprocessor of claim 1, wherein the third operation result is stored in said memory data register, and said second operation result stored in said second register and said third operation result stored in said memory data register are inputted to said ALU which carries out a fourth operation to output a fourth operation result to said memory data register, and said fourth operation result being transferred from said memory data register to the external memory.

11. The microprocessor of claim 10, wherein the fourth operation is a logical OR operation of the second and third operation results.

12. A microprocessor for transferring N bits of a M-bit data stored in a first register of a microprocessor to an arbitrary M-bit data area of an external memory, where N and M are positive integers and N<M, comprising:

a control circuit for generating control signals to control an operation of the microprocessor;

a second register;

a first operand bus and a second operand bus coupled to said first register and said second register;

a mask ROM connected to the first and second operand buses and generating a predetermined mask data for masking M-N or N bits of data;

an ALU connected to the first and second operand buses and carrying out a first operation on the M-bit data inputted from first register and the predetermined mask data and outputting a first operation result, the first operation result being temporarily stored in the second register; and a memory data register connected to the first and second operand buses and the destination bus, and receiving M-bit data from the external memory and outputting the M-bit data to said ALU via the first or second operand bus, said ALU carrying out a second operation between the M-bit data and the predetermined mask data, and outputting a second operation result to the destination bus.

13. The microprocessor of claim 12, wherein N equals 4 and M equals 8.

14. The microprocessor of claim 13, wherein the predetermined mask data used for masking the M-bit data of the first register during the first operation of said ALU is F0 (hexadecimal), and the predetermined mask data for masking the M-bit data from said memory data register during the second operation of said ALU is 0F (hexadecimal).

15. The microprocessor of claim 13, wherein the predetermined mask data used for masking the M-bit data from the first register during the first operation of said ALU is 0F (hexadecimal), and the predetermined mask data for masking the M-bit data from said memory data register during the second operation of said ALU is F0.

16. The microprocessor of claim 12, wherein the microprocessor transfers N high-order bits of the M-bit data stored in the first register to N high-order bits of the arbitrary M-bit data area of the external memory.

17. The microprocessor of claim 12, wherein the microprocessor transfers N low-order bits of the M-bit data stored in the first register to N low-order bits of the arbitrary M-bit data area of the external memory.

18. The microprocessor of claim 12, wherein the first and second operations are logical AND operations.

19. The microprocessor of claim 12, wherein said control circuit includes:

i) a decode circuit to retrieve and to decode an instruction from the external memory, and ii) a ROM or random logic having a microprogram to generate an input/output control signal, a register select signal, an operation control signal and a data selection signal in accordance with the decoded instruction from said decode circuit.

20. The microprocessor of claim 12, wherein the second operation result is stored in said memory data register, and said first operation result stored in said second register and said second operation result stored in said memory data register are inputted to said ALU which carries out a third operation to output a third operation result to said memory data register, and said third operation result being transferred from said memory data register to the external memory.

21. The microprocessor of claim 20, wherein the third operation is a logical OR operation of the first and second operation results.

22. A method of transferring N bits of a M-bit data stored in a first register of a microprocessor to an arbitrary M-bit data area of an external memory, where N and M are positive integers and N<M, comprising the steps of:

retrieving and decoding an instruction from the external memory;

performing a first logical operation on the M-bit data inputted from first register into an arithmetic logic unit (ALU) to generate a first operation result;

outputting the first operation result via a destination bus and temporarily storing the first operation unit result in a second register, a first operand bus and a second operand bus each being coupled to said first and second registers and the ALU;

generating a predetermined mask data stored in a mask ROM and outputting the predetermined mask data from the mask ROM to the ALU, the mask ROM being connected to the first and second operand bus and transferring the mask data from the mask ROM to the ALU via the first or second operand bus;

performing a second logical operation between the first operation result stored in the second register and the predetermined mask data from the mask ROM inputted to the ALU and outputting a second operation result on the destination bus;

storing the second operation result in the second register;

transferring M-bit data from the external memory to a memory data register connected to the first and second operand buses and the destination bus; and performing a third logical operation between the M-bit data from the memory data register and the predetermined mask data from the mask ROM inputted to the ALU, and outputting a third operation result to the destination bus.

23. The method of claim 22, further comprising:

i) storing the third operation result in the memory data register;

j) performing a fourth logical operation between the second operation result from the second register and the third operation result from the memory data register inputted into the ALU to generate a fourth operation result; and k) transferring the fourth operation result to the external memory.

24. The method of claim 22, wherein the second and third operations are logical AND operations.

25. The method of claim 23, wherein the fourth operation is a logical OR operation of the second and third operation results.

26. A method of transferring N bits of a M-bit data stored in a first register of a microprocessor to an arbitrary M-bit data area of an external memory, where N and M are positive integers and N<M, comprising the steps of:

retrieving and decoding an instruction from the external memory;

generating a predetermined mask data stored in a mask ROM and outputting the predetermined mask data from the mask ROM to an arithmetic logic unit (ALU);

performing a first logical operation on the M-bit data from the first register and the predetermined mask data from the mask ROM inputted into the ALU to generate a first operation result;

outputting the first operation result via a destination bus and temporarily storing the first operation unit result in a second register, a first operand bus and a second operand bus each being coupled to said first and second registers, the mask ROM and the ALU with the mask ROM transferring the mask data from the mask ROM to the ALU via the first or second operand bus; and performing a second logical operation between the M-bit data from the memory data register and the predetermined mask data from the mask ROM inputted to the ALU to generate a second operation result which is stored in the memory data register via the destination bus.

27. The method of claim 26 further comprising:

g) performing a third logical operation between the first operation result from the second register and the second operation result from the memory data register inputted into the ALU to generate a third operation result; and h) transferring the third operation result to the external memory.

28. The method of claim 27, wherein the third operation is a logical OR operation of the first and second operation results.

29. The method of claim 26, wherein the first and second operations are logical AND operations.

* * * * *